United States Patent [19]

Naruse et al.

[11] Patent Number: 4,821,338
[45] Date of Patent: Apr. 11, 1989

[54] OPTICAL SIGNAL RECEIVING APPARATUS WITH COMPENSATION FOR PERIPHERAL LIGHT

[75] Inventors: Kazuhiko Naruse, Nabari; Akira Kataoka, Sennan; Masayasu Hirano, Nishinomiya; Naoya Takata, Amagasaki, all of Japan

[73] Assignee: Minolta Camera Kabushiki Kaisha, Osaka, Japan

[21] Appl. No.: 893,404

[22] Filed: Aug. 5, 1986

[30] Foreign Application Priority Data

| Aug. 7, 1985 | [JP] | Japan | 60-173818 |
| Nov. 1, 1985 | [JP] | Japan | 60-246749 |
| Nov. 1, 1985 | [JP] | Japan | 60-246750 |
| Nov. 1, 1985 | [JP] | Japan | 60-246751 |
| Nov. 1, 1985 | [JP] | Japan | 60-246752 |
| Nov. 1, 1985 | [JP] | Japan | 60-246753 |
| Nov. 1, 1985 | [JP] | Japan | 60-246754 |

[51] Int. Cl.⁴ .......................................... H04B 9/00
[52] U.S. Cl. .................................. 455/617; 250/214 B; 324/429; 340/636; 340/815.32; 358/213.15; 455/619
[58] Field of Search ............... 455/606, 607, 617, 619; 340/815.32, 636; 250/214 A, 214 AG, 214 AL, 214 B, 229, 237 R; 350/311; 324/429; 370/3; 358/213.15, 36

[56] References Cited

U.S. PATENT DOCUMENTS

| 2,458,401 | 1/1949 | Moore | 340/815.32 |
| 2,784,388 | 3/1957 | King et al. | 340/815.32 |
| 3,121,798 | 2/1964 | Ploke | 250/237 R |
| 4,220,412 | 9/1980 | Shroyer et al. | 356/226 |
| 4,290,043 | 9/1981 | Kaplan | 455/606 |
| 4,413,234 | 11/1983 | Ludoli | 340/636 |

FOREIGN PATENT DOCUMENTS

| 3336027 | 4/1985 | Fed. Rep. of Germany | 455/619 |
| 361105 | 11/1938 | Italy | 340/815.17 |
| 56-112143 | 9/1981 | Japan | 370/3 |
| 60-67249 | 4/1985 | Japan | 455/619 |

OTHER PUBLICATIONS

Crask-Ideas For Design-Electronic Design-Aug. 16, 1980, p. 189, vol. 28, #17.

Primary Examiner—Robert L. Griffin
Assistant Examiner—Leslie Van Beek
Attorney, Agent, or Firm—Price, Gess & Ubell

[57] ABSTRACT

An improved optical signal receiving apparatus useful in optical communication is provided. Peripheral light can be measured and compared to determine if its intensity is above a certain predetermined level. The apparatus can display an indication when the measured intensity is over the predetermined level, such as through an emission at a predetermined wavelength.

27 Claims, 10 Drawing Sheets

OPTICAL SIGNAL RECEIVING APPARATUS WITH COMPENSATION FOR PERIPHERAL LIGHT

BACKGROUND OF THE INVENTION

1. Field of the Invention

The present invention relates to an optical communication apparatus which uses an optical signal as a signal transmitting medium, and more particularly, to an apparatus which receives an optical signal transmitted from a transmitter which emits an optical signal.

2. Description of the Prior Art

An optical communication apparatus is conventionally known which, using light receiving elements such as a photodiode as a light receiving element, receives an optical signal emitted from a signal transmitting apparatus by means of the above-described light receiving element, so that information can be transmitted from distant places.

In such an apparatus, the photodiodes generates photoelectric current which corresponds not only to the intensity of light emitted from the signal transmitting apparatus but also to the intensity of peripheral light such as shot noise and pulse light generated from fluorescent lamps. This may cause the optical signal receiving apparatus to be incorrectly operated, with the result that information transmitted from a transmitter may be incorrectly received by the light receiving apparatus.

Furthermore, in such conventional device, signal/noise ratio is deteriorated when it is used outdoors because the intensity of peripheral light such as sun-light is much higher than that of transmitted optical signal.

It is known that in some of such receiving apparatuses, a photoelectric element is used as the optical signal receiving element and a resistor is connected in series to the photoelectric element.

The above-described structure, when used outdoors, is disadvantageous in that photosensitivity is deteriorated because it is difficult for the photoelectric current corresponding to the signal light to flow in a circuit. This is caused by the fact that electric potential increases at connection point of the photoelectric element and the resistor, to be approached to the power supply voltage owing to the increase of the photoelectric current caused by increase of the intensity of surrounding light.

Therefore, conventional optical communication apparatuses have a disadvantage in which correct signal communication can be achieved in relatively short distance range when the intensity of light on the light receiving element is relatively high, and in which it can be achieved in relatively long distance range when the intensity is relatively low.

SUMMARY OF THE INVENTION

It is the principal object of the invention to provide an optical signal receiving apparatus for optical communication, which prevents information from being transmitted incorrectly owing to the interruption of peripheral light.

It is another object of the invention to provide an optical signal receiving apparatus which is capable of warning users beforehand of incorrect transmission of information which occur caused by interruption of peripheral light.

It is a further object of the invention to provide an optical signal receiving apparatus for optical communication which is capable of correctly receiving optical signal without lowering light sensitivity even if it is used in a place where it is subjected to a high quantity of peripheral light such as outdoor light.

The features of the present invention which are believed to be novel are set forth with particularity in the appended claims. The present invention, both as to its organization and manner of operator, together with further objects and advantages thereof, may best be understood by reference to the following description, taken in conjunction with the accompanying drawings.

BRIEF DESCRIPTION OF THE INVENTION

DETAILED DESCRIPTION OF THE PREFERRED EMBODIMENTS

An embodiment according to the invention is described hereinafter with reference to the drawings.

Figure 1:
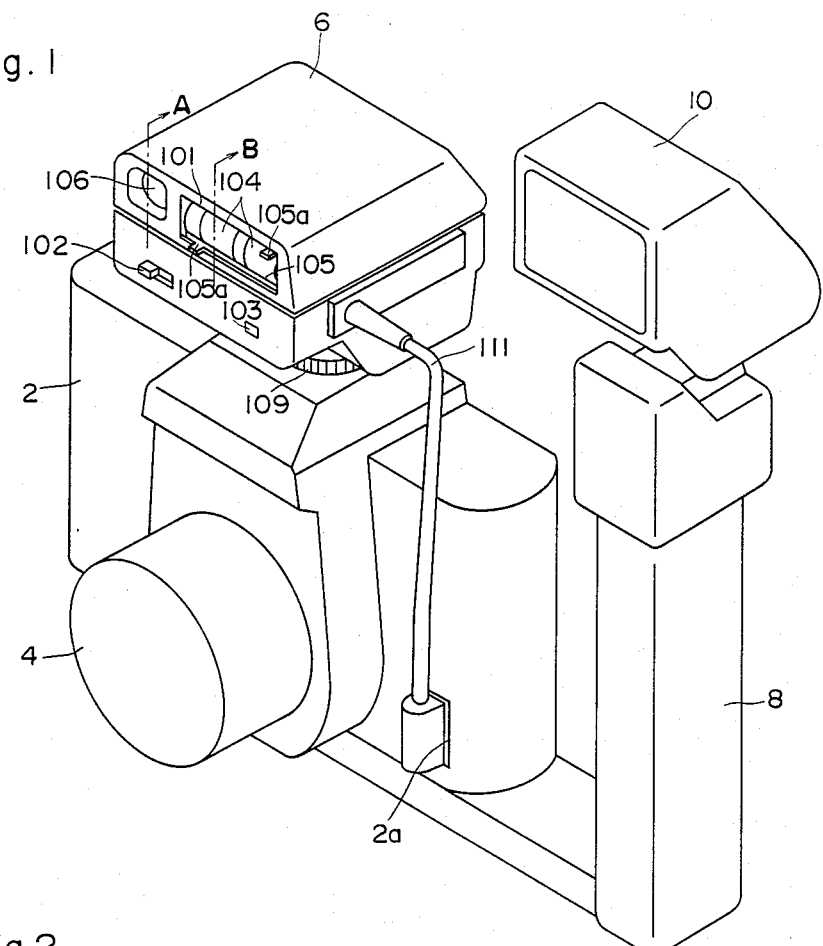
FIG. 1 is a perspective illustration showing the camera system using an optical signal receiving apparatus for optical communication of an embodiment according to the invention.

FIG. 1 is a perspective view showing a camera system which transmits light measuring information and controls an operation of camera using an optical communication apparatus of an embodiment according to the invention. In FIG. 1, Numeral 2 shows a camera body on which a photographing lens 4 is mounted. A receiver 6, of the optical communication apparatus, is connected electrically and mechanically to the camera body 2 as described below. A bracket 8 is connected electrically and mechanically to the above-described camera body 2 at a lower portion thereof. An electronic flash device 10 is connected electrically to the camera body 2 through the bracket 8.

As shown in the front view of the optical signal receiving apparatus in FIG. 2, the receiver 6 is provided with an optical signal receiving window 101 for receiving the optical signal transmitted from the transmitter shown in FIG. 3, an electric power switch 102, and a light emitting diode 103 for warning when a battery check circuit described below detects that the voltage of power source becomes under a predetermined voltage. The light receiving window 101 is provided with a pair of light receiving lens 104 and a pair of light shielding hoods 105 mounted at its upper and lower portion that can be opened and closed. Formed on the light shielding hood 105 are a pair of knobs 105a respectively for manually opening and closing the hood 105. Numeral 106 shows a light reception indicating window in which a light emitting diode 107 for indicating optical signal reception is disposed. When optical signal is normally received, the light emitting diode 107 flashes. According to this flashing, a user who is controlling the transmitter knows that a correct optical signal reception has been made. Disposed behind the pair of the light receiving lenses 104 are light receiving elements PD1 and PD2 composed of a photodiode described below.

The receiver 6, comprising an upper portion 6a and a lower portion 6b, is attached to the camera body 2 by means of a shoe foot 108 mounted on the lower portion 6b, which is inserted into the accessory shoe of the camera body 2. The shoe foot 108 is fixed to the camera body 2 by means of a fixing nut 109. The receiver 6 is electrically connected to the camera body 2 by a movable contact pin 110, mounted on the shoe foot 108, which contacts with a fixed contact point mounted on the accessory shoe of the camera body 2. This construction allows the camera body 2 to receive an exposure data and control data transmitted from the transmitter via the receiver 6. Of the data thus received, necessary data are transmitted to the electronic flash device 10 through the bracket 8.

Figure 2:
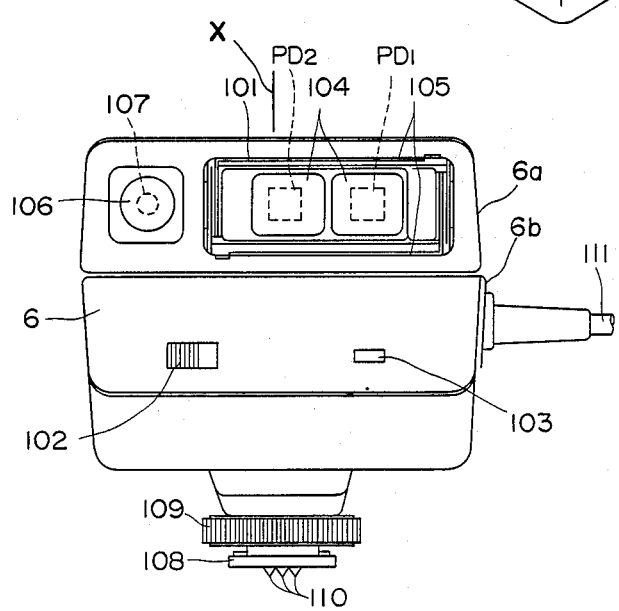
FIG. 2 is a front view showing the optical signal receiving apparatus.

The upper portion 6a of the receiver 6 can be rotated relative to the lower portion 6b around an axis X which extends vertically in FIG. 2, which permits the direction of light receiving window 101 and the light reception indicating window 106 to change. The camera body 2 may be so constructed that the exposure data received by the receiver 6 is transmitted to the camera body 2 through a signal code 111 which is connected to an input terminal 2a of the camera body 2, and that the exposure data is transmitted from the movable contact pin 110, while the control data is transmitted from the signal code 111 to the camera body 2.

Figure 3:
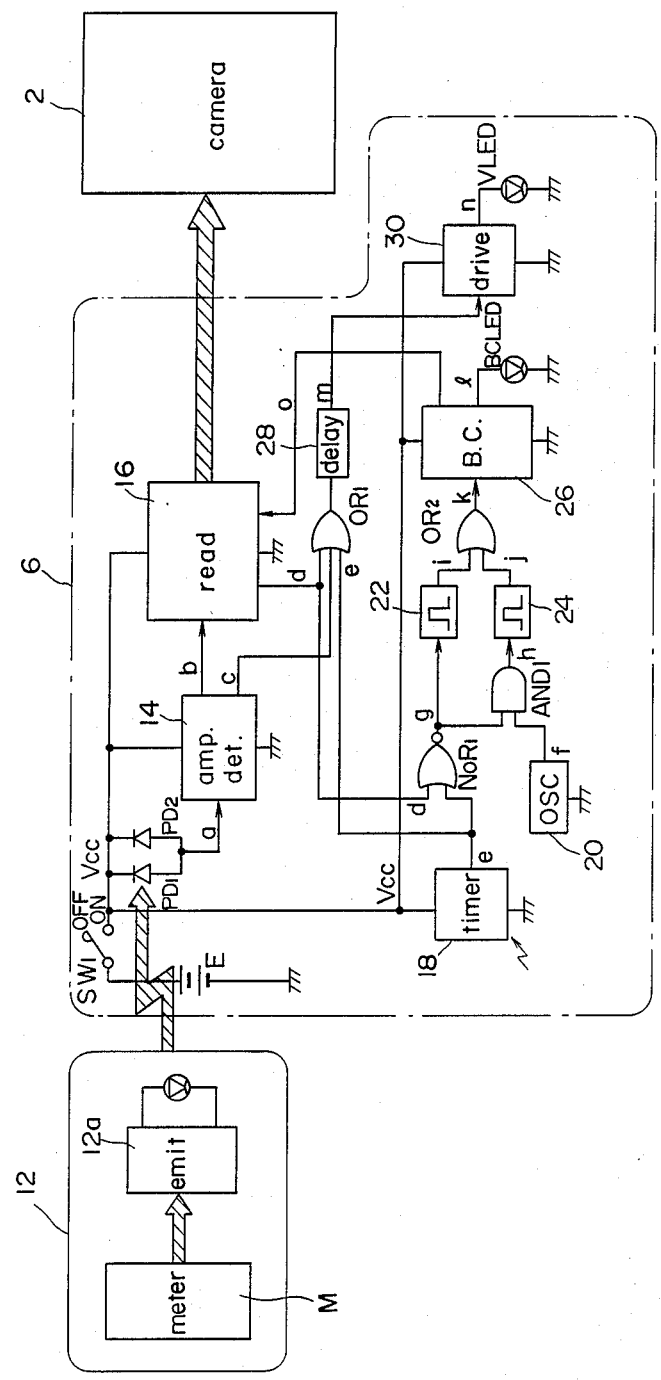
FIG. 3 is a block diagram showing the electrical circuit of the system.

FIG. 3 is a block diagram showing an electric circuit of this embodiment. In FIG. 3, numeral 12 shows a transmitter of an optical communication apparatus which transmits an infrared light signal formed by modulating a digital signal to be transmitted. A meter M and a transmitting circuit 12a are mounted inside the transmitter 12. As the applicant proposed in pending U.S. Ser. No. 697,711 (filed Feb. 1, 1985), the meter M measures and stores brightness of an object to be photographed and the amount of flash light emitted, and sends an exposure data showing a proper exposure time or a proper aperture value calculated in accordance with a set data showing set film sensitivity set exposure time, set aperture value and so on. The exposure data is transmitted after being converted to infrared light signal by the transmitting circuit 12a, and received by the light receiving elements PD1 and PD2 composed of photodiode in the receiver 6.

E is a power supply battery for the receiver 6. SW1 is a power supply switch for the receiver 6. When the power supply switch SW1 is closed, the light receiving elements PD1 and PD2 receive an infrared light signal from the transmitter 12 and output electric current (a) according to the intensity of the infrared light signal. The electric current (a) outputted from the light receiving elements PD1 and PD2 is inputted to the amplification and detection circuit 14 which amplifies, detects, and transmits the electric current (a) as data signal (b) to a data read circuit 16. The amplification and detection circuit 14 outputs a warning signal (c) when the intensity of peripheral light component which is incident on the light elements PD1 and PD2 in the receiver 6 independently of infrared light transmitted from the transmitter 12 is higher than a predetermined value. The detailed description of the structure of the amplification and detection circuit 14 is made below with reference to FIG. 4.

A data read circuit 16 functions as a data transmitting circuit i.e., it reads and checks the data signal (b) transmitted from the amplification and detection circuit 14, and stores the data to transmit it to the camera body 2. The circuit 16 includes an interface circuit which transmits data. The data read circuit 16 transmits the read exposure data to the camera body 2 through the movable contact pin 110 shown in FIG. 2. The data read circuit 16 outputs a signal (d) which indicates that a signal transmitted by a transmitter for optical communication apparatus has been correctly read when the data signal (b) transmitted from the amplification and detection circuit 14 has been read correctly. Hereinafter, the signal (d) is referred to as a verify signal.

Numeral 18 is a timer circuit which outputs a timer signal (e) to "H" a certain time period after the power supply switch SW1 is closed. The timer signal (e) and the above-described verify signal (d) are inputted to NOR circuit NOR1. The signal (g) outputted from the NOR circuit NOR1 is inputted to one of the input terminals of AND circuit AND1. The signal (f) outputted from an oscillator 20 is inputted to the other input terminal of AND circuit AND1. The signal (g) outputted from NOR circuit NOR1 and the signal (h) outputted from AND circuit AND1 are inputted to one shot circuits 22 and 24, respectively. The one shot circuits 22 and 24 output pulse having a certain time width according to the positive edges of inputted signals (g) and (h).

Signals (i) and (j) outputted from the one shot circuits 22 and 24, respectively are inputted as a signal (k) to a battery check circuit 26 via OR circuit OR2. The battery check circuit 26 timely checks the power supply voltage Vcc in response to the inputted signal (k). If the power supply voltage Vcc is below a predetermined value, the battery check circuit 26 latches it and outputs a signal (1) to energize a light emitting diode BCLED for a warning of a lowering of voltage. The operation of the battery check is described in detail below.

The warning signal (c) outputted from the amplification and detection circuit 14, the verify signal (d) outputted from the data read circuit 16, and the timer signal (e) outputted from the timer circuit 18 are inputted to an OR circuit OR1. The power outputted from the OR circuit OR1 is inputted to a display drive circuit 30 as a signal (m) via a delay circuit 28. When any of the signals inputted to OR circuit OR1 becomes "H", a light emitting diode VLED is energized by the display drive circuit 30 in a certain time period fixed by the delay circuit 28 i.e., the light emitting diode VLED for indicating verify signal is lighted by a signal (n) outputted from the display drive circuit 30 if the timer signal (e) has been outputted from the timer circuit 18 when it is detected that the intensity of peripheral light is over a predetermined value and the data is correctly read. When the signal from OR circuit OR1 becomes "L", the light emitting diode VLED for indicating verify signal is disenergized by the display drive circuit 30 after a certain time period fixed by the delay circuit 28.

Figure 4:
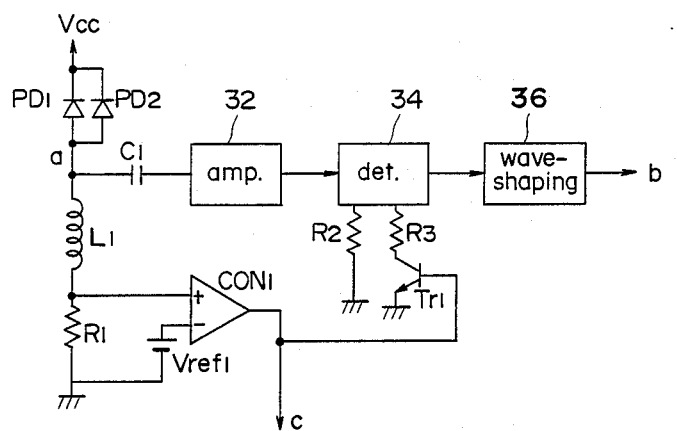
FIG. 4 is a circuit diagram showing the concrete structure of the amplification detection circuit of the apparatus.

Next, the detailed structure of the amplification and detection circuit 14 is shown in FIG. 4. In FIG. 4, the light receiving elements PD1 and PD2 composed of photodiodes are connected in parallel with each other, and the output signal (a) is taken out of the anodes. The anodes of the light receiving elements PD1 and PD2 are grounded via an inductance L1 and a resistor R1. The output signal (a) is inputted to an amplifier 32 via a capacitor C1 and the output signal (a) is amplified by the amplifier 32. The amplified signal is inputted to a detection circuit 34 and the signal, modulated to infrared light with 10 KHz is detected by the detection circuit 34, is demodulated to the digital signal, and thereafter, transmitted to a wave-shaping circuit 36. The wave-shaping circuit 36 outputs the waveform of the inputted signal as the data signal (b) after shaping it to be suitable for the data read circuit 16.

The inductance L1 is connected to the resistor R1 in series and its connection point is connected to the non-inverting input terminal of a comparator CON1. A reference supply Vref1 which generates reference voltage is connected to the inverting input terminal of the comparator CON1. The output signal of the comparator CON1 is outputted as the above-described warning signal (c) and inputted to the base of a transistor Tr1 as well. The collector of the transistor Tr1 is connected to the detection circuit 34 via the resistor R3, and its emitter is grounded. The detection circuit 34 is grounded via the resistor R2. The transistor Tr1 is used as a switch and conductive when the signal outputted from the comparator CON1 is "H" and non-conductive when it is "L".

The operation of the amplification and detection circuit comprising the above-described structure is described below. When peripheral light has been incident on the light receiving elements PD1 and PD2, photoelectric current proportional to the intensity of the peripheral light is generated. Such photoelectric current is considered direct-current component or commercial frequency component with having frequency of 60 Hz×2 (or 50 Hz×2). Therefore, the impedance toward the inductance L1 is low and the impedance toward the capacitor C1 is high. As a result, the above-described photoelectric current flows toward the inductance L1 and the resistor R1. Voltage is generated across the resistor R1 according to the intensity of the photoelectric current. This voltage is compared with the reference voltage of the reference supply Vref1 by the comparator CON1. When the voltage across the resistor R1 is lower than the reference voltage Vref1, the intensity of peripheral light component is low and the quantity of the photoelectric current generated in the light receiving elements PD1 and PD2 are small. Thus, the output of the comparator CON1 is "L", so that the warning signal (c) is not given. Accordingly, the transistor Tr1 is non-conductive in this case and the quantity of the electric current which flows from the detection circuit 34 to the ground terminal is kept small by the resistor R2 and the detection sensitivity of the detection circuit 34 is set to be high. That is, when the quantities of peripheral light component and photoelectric current generated in the light receiving elements PD1 and PD2 are small, the sensitivity of the detection circuit 34 is set to be high.

When modulated infrared light signal with several 10 KHz is incident on the light receiving elements PD1 and PD2 from the transmitter 12 in this condition, the light receiving elements PD1 and PD2 generate photoelectric current corresponding to the peripheral light component as well as the infrared light signal. The inductance L1 has a high impedance relative to alternative current component, while the impedance of the capacitor C1 relative thereto is low. Accordingly, the alternative current component of the photoelectric current outputted from the light receiving elements PD1 and PD2, namely, the photoelectric component corresponding to the infrared light component is inputted to the amplifier 32 via the capacitor C1, and thereafter, amplified. Since the direct current component, namely, the photoelectric current corresponding to the peripheral light component is cut by the capacitor C1, it flows toward the inductance L1 and the resistor R1. The signal amplified by the amplifier 32 is inputted to the detection circuit 34 whose sensitivity is set to be high and outputted to the data read circuit 16 as the data signal (b) after its waveform is shaped by the wave-shaping circuit 36.

Contrarily, when the quantity of the photoelectric current corresponding to the peripheral light component is large because the intensity of peripheral light is high and the voltage across the resistor R1 is larger than the reference voltage Vref1, the output of the comparator CON1 becomes "H" and the warning signal (c) is given and the light emitting diode VLED for indicating verify is lighted to warn users that signal transmission may be interfered by peripheral light. When the output of the comparator CON1 becomes "H", the transistor Tr1 becomes conductive and the detection circuit 34 is grounded via the resistors R2 and R3, and the quantity of electric current which flows from the detection circuit 34 to the ground terminal increases, so that the sensitivity of the detection circuit 34 becomes low. This eliminates the influence given by shot nose and fluorescent lamps. The above-described shot noise and the pulsed light from fluorescent lamps may be taken for signal component because the intensity of the shot noise is proportional to the square root of peripheral light brightness in the condition when the peripheral light is strong. Such an error can be prevented by lowering the sensitivity of the circuit 34 in this embodiment which has such a structure that noise is not transmitted to the detection circuit 34 when the intensity of peripheral light is high.

There is a case that the comparator CON1 needs to have hysteresis characteristic to prevent it from repeating from "H" to "L" or "L" to "H" caused by being illuminated by light source which flashes, however, the description of it is omitted herein because this matter is not relevant to the present invention.

Following is the summary of the function and operation of each electrical element in the circuit in FIG. 4.

Capacitor C1 cuts off direct current component of the output of light receiving elements PD1 and PD2. The inductance L1 and resistor R1 serves as a means for flowing the photoelectric current corresponding to the signal component toward the capacitor C1 and the photoelectric current corresponding to the peripheral light component toward the inductance L1. The comparator CON1 determines whether or not the intensity of peripheral light is higher than a predetermined value by comparing the voltage across the resistor R1 with the reference voltage. Since the inductance L1 has little direct current resistance, improved load characteristic is obtained by reducing the resistance of resistor R1, i.e, an optical signal can be correctly received without saturating the amplification and detection circuit 14. When the intensity of light received by the light receiving elements PD1 and PD2 is too high, noise generated by peripheral light component is transmitted to the data read circuit 16 as the data signal (b). Therefore, in a receiver of the embodiment, detection sensitivity is controlled, in accordance with a result determined by the comparator CON1, to prevent noise from being transmitted to the data read circuit 16. Further, if the receiver 6 receives peripheral light having a high intensity, an indication is made to warn users of it.

Figure 5:
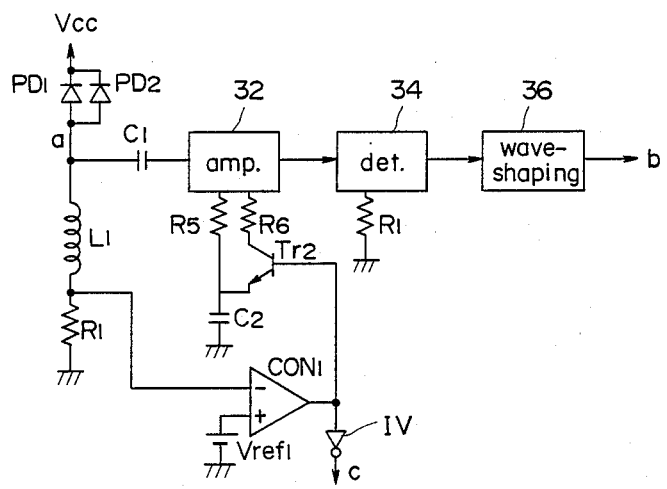
FIGS. 5 through 9 are circuit diagrams showing modifications of the amplification detection circuit of the apparatus.

FIG. 5 is a circuit diagram showing a modification of the amplification and detection circuit shown in FIG. 4. The sensitivity of the detection circuit 34 is changed according to a determined result of the comparator CON1 in the circuit shown in FIG. 4, while in the modification shown in FIG. 5 amplification degree of the amplifier 32 is adjusted according to a result determined by the comparator CON1. The difference of the circuit structure in FIG. 5 from that in FIG. 4 is that the amplifier 32 is grounded via a resistor R5 and a capacitor C2. Besides this, the output from the comparator CON1, whose polarity is reversed in the non-inversion input and inversion input as against those in FIG. 4, is connected to the base of a transistor Tr2 whose collector and emitter are connected in series to a resistor R6 disposed between the amplifier 32 and the capacitor C2. Accordingly, the amplification degree of the amplifier 32 is determined by the resistor R5 and R6.

According to the above-described structure, when the intensity of peripheral light is too low to generate photoelectric current in small quantities, the output of the comparator CON1 is "H" and the transistor Tr2 is conductive. Therefore, when the amplification degree of the amplification 32 is determined by the resistors R5 and R6; its amplification degree is high. When the intensity of peripheral light component is high and the voltage of the photoelectric current corresponding to the peripheral light is higher than the reference voltage, the output from the comparator CON1 becomes "L", so that the transistor Tr2 becomes non-conductive. Consequently, the amplification degree of the amplifier 32 is determined only by the resistor R5; the amplification degree of the amplifier 32 is set to have low amplification degree. Thus, in this modification, when the intensity of peripheral light is low, noise is prevented from being transmitted to the data read circuit 16 as the data signal (b) by lowering the amplification degree of the amplifier 32. In this modified circuit, the output of the comparator CON1 is inputted to an inverter IV and the output of the inverter IV is used as the warning signal (c).

Figure 6:
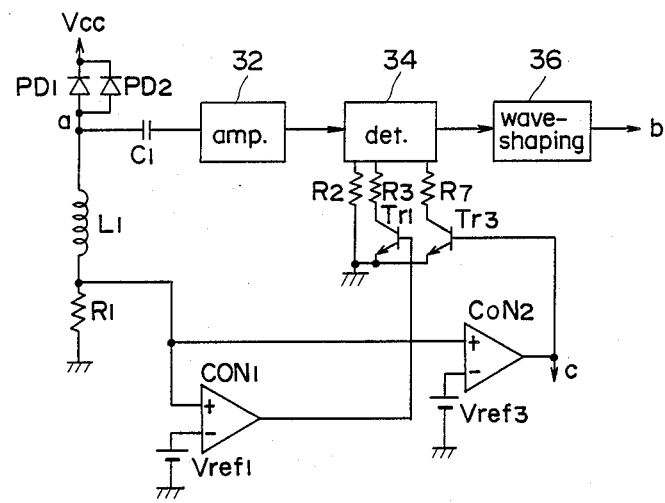

FIG. 6 is a circuit diagram showing another modification of the amplification and detection circuit shown in FIG. 4. In this modification, the sensitivity of a detection circuit 34 is changed at three steps according to a result determined by the comparator CON1. The connecting point of the inductance L1 and the resistor R1 is connected to the non-inversion input terminal of the second comparator CON2. Connected to the inversion input terminal is a second reference supply Vref3 which generates reference voltage higher than the the reference supply voltage Vref1. The output of the comparator CON2 is connected to the base of the transistor Tr3 whose collector and emitter are connected in series to a resistor R7 disposed between the detection circuit 34 and the ground terminal.

When the voltage across the resistor R1 according to the intensity of peripheral light component is very low, the outputs of the comparators CON1 and CON2 are "L" and the transistor Tr1 and Tr3 are non-conductive, so that the sensitivity of the detection circuit 34 is determined only by the resistor R2; the sensitivity of the detection circuit 34 becomes highest. When the voltage across the resistor R1 is a little higher than the above-described voltage, since the reference voltage of the reference supply Vref1 is lower than the reference voltage of the reference supply Vref2, the output of the comparator CON1 is "H" and only the transistor Tr1 is conductive, and the resistor R3 is connected in parallel to the resistor R2. Accordingly, in this case, the sensitivity of the detection circuit 34 is lowered by one step. If the intensity of peripheral light is higher, and as a result, the voltage across the resistor R1 becomes higher, the outputs of both comparators CON1 and CON2 become "H" and the transistors Tr1 and Tr3 become conductive. As a result, the resistors R3 and R7 are connected to the resistor R2 in parallel and the sensitivity of the detection circuit 34 is lowered by two steps. Thus, in this modification, the sensitivity of the detection circuit 34 can be changed at three steps. The output of the comparator CON2 is used as the warning signal (c) in this modification.

By increasing the number of resistors, comparators, and reference supplies, the detection circuit is allowed to have sensitivity change at more than four steps. Like the modification shown in FIG. 5, it is easy to allow the amplification degree of the amplifier 32 to have more than three steps.

Figure 7:
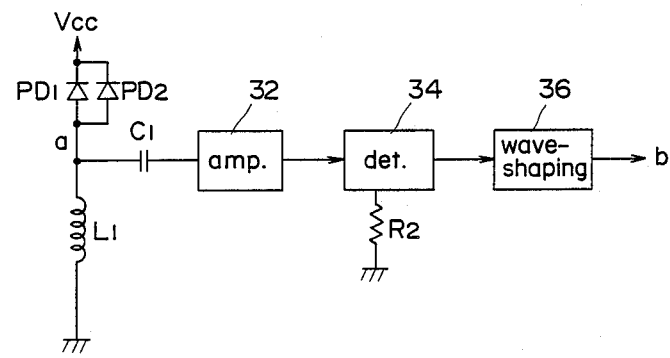

FIG. 7 shows a circuit structure in which a signal can be read without saturating the circuit because photodiodes, which compose light receiving elements PD1 and PD2, the incident provide a favorable load characteristic even if it is intensity is relatively high. In this circuit, the input terminal of the amplifier 32 is connected to the connection point of the light receiving elements PD1 as well as PD2 and the inductance L1 via the capacitor C1. In this case, the direct current component of the photoelectric current outputted from the light receiving elements PD1 and PD2 is removed by the capacitor C1, inputted to and amplified by the amplifier 32. Thereafter, only a signal component is detected by the detection circuit 34, and then, an outputted waveform is shaped by the wave-shaping circuit 36. However, this structure is incapable of indicating the warning due to the intensity of peripheral light component, of switching the sensitivity of the detection circuit 34, and of switching the amplification degree of the amplifier 32.

Figure 8:
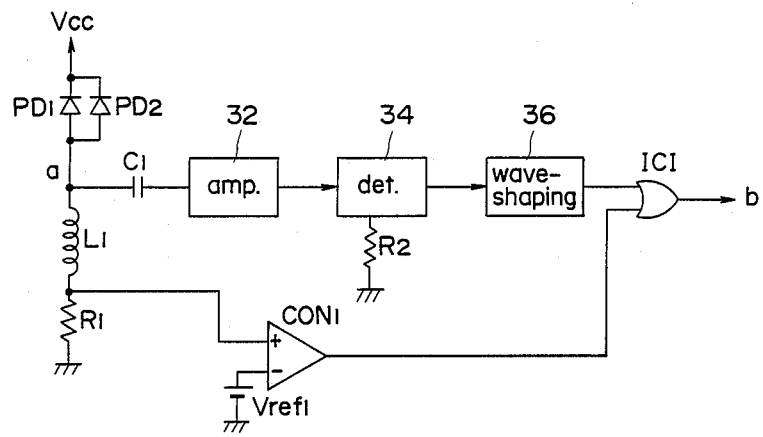

FIG. 8 is a circuit diagram showing another modification of the amplification and detection circuit shown in FIG. 4. In this modification, the output of the comparator CON1 is connected to one input terminal of OR circuit IC1. The output of the wave-shaping circuit 36 is connected to the other input terminal of the OR circuit IC1. In this structure, if the intensity of peripheral light component is low, the output of the comparator CON1 is "L". Therefore, the signal outputted from the wave-shaping circuit 36 is inputed to the data read circuit 16 without changing its voltage through the OR circuit ICs. When the intensity of peripheral light component is high, the output of the comparator CON1 is "H", the output of the OR circuit IC1 maintains "H" without being influenced by the output from the wave-shaping circuit 36. That is, when the intensity of peripheral light is high, the signal outputted from the wave-shaping circuit 36 is not inputted to the data read circuit 16, but fixed to be "H". According to this construction, noise generated by peripheral light component is not transmitted to the data read circuit 16 and a malfunction that a false signal is transmitted to the data read circuit 16 as the data signal (b) is not generated.

Figure 9:
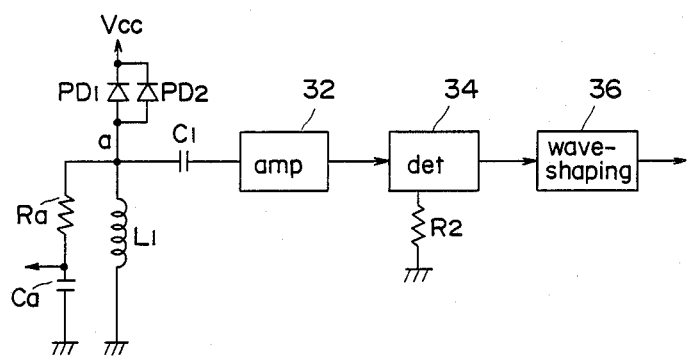

FIG. 9 is a circuit diagram showing another modification which selects only direct current component corresponding to peripheral light component of the photoelectric current generated by the light receiving elements PD1 and PD2. In order to take out only direct current component within the photoelectric current generated by the light receiving elements PD1 and PD2, a smoothing circuit comprising a resistor Ra and a capacitor Ca is used. The time constant of this smoothing circuit is so set that alternating current component with about 60 Hz emitted from fluorescent lamps is taken out of the connection point of the resistor Ra and the capacitor Ca. The structure which descriminates the intensity of peripheral light according to the output of the connection point is capable of taking out only peripheral light component.

Figure 10:
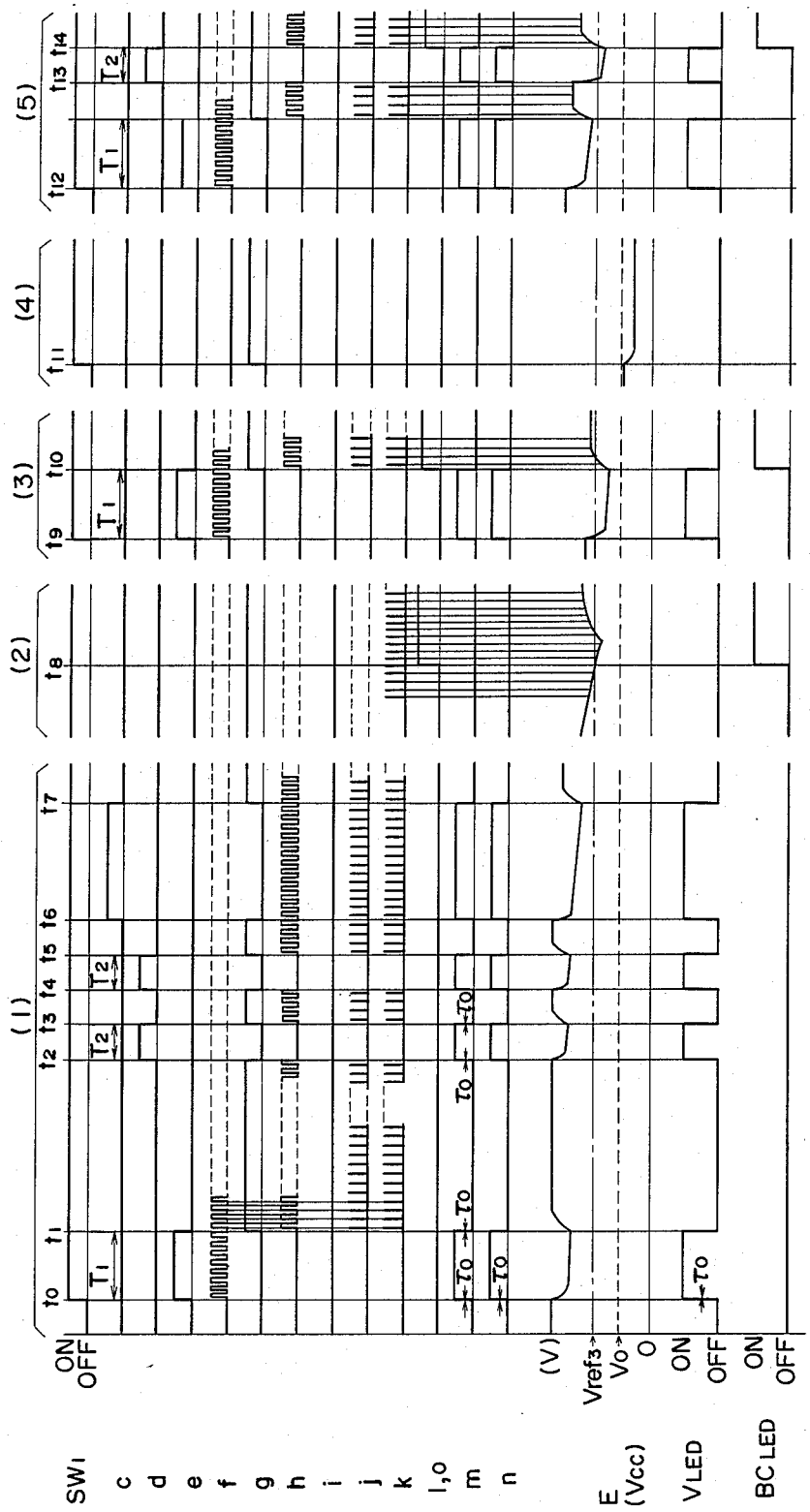
FIG. 10 is a time chart showing the operation of the system in FIG. 3.

The operation of the battery check system shown in FIG. 3 is described with reference to the time chart shown in FIG. 10. In FIG. 10, (1) shows the operation at the time when the voltage of the power supply battery E is high enough. When the power supply switch SW1 is closed at time t0, the timer circuit 18 gives the timer signal (e) of "H" and maintains the timer signal (e) in the time period T1, and then stops giving the timer signal (e) at time t1. When the power supply switch SW1 is closed, the signal (f) is started to be generated from the oscillator 20. In this case, the warning signal (c) and the verify signal (d) are not given by the amplification and detection circuit 14 and by the data read circuit 16, respectively, and both outputs keep "L". The signal (f) outputted from the oscillator 20 makes the output power from the OR1 circuit "H". Accordingly, It is in the predetermined time period $\tau_0$ after the output of the timer circuit 18 becomes "H" that the signal (m) outputted from the delay circuit 28 becomes "H". The signal (m) outputted from the delay circuit 28 drives the display drive circuit 30. The signal (n) outputted from the display drive circuit becomes "H" causes the light emitting diode VLED for indicating verify to be lighted. Since the timer signal becomes "H", the signal (g) outputted from NOR circuit NOR1 becomes "L". Accordingly, the signal (f) outputted from the oscillator 20 does not appear in the output (h) from the AND circuit AND1.

When the timer signal (e) of the timer circuit 18 becomes "L at the time t1, the signal (g) outputted from the NOR circuit NOR1 is inverted to "H" and a short pulse signal (i) is outputted from one shot circuit 22. The pulse signal (i) is inputted to the battery check circuit 26 as a signal (k) via the OR circuit OR2. The battery check circuit 26 checks the voltage Vcc of the power supply battery E at the timing according to the pulse signal (k) and determines whether or not the power supply voltage Vcc is over the predetermined value shown as Vref3 in FIG. 10. Since the output signal (m) of the delay circuit 28 is kept "H" after the time period to from the output signal of "H" of the OR circuit OR1 while the battery is being checked, the lighting of the light emitting diode VLED for indicating verify continues.

The timer signal (e) becomes "L" with the elapse of time period T1 determined by the timer circuit 18 from the time t1. Thereafter, the signal (g) outputted from NOR circuit NOR1 is inverted to "H", so that a signal in synchronous with an oscillation signal (f) outputted from the oscillator 20 is outputted from the AND circuit AND1 and inputted to the one shot circuit 24 as the signal (h). Accordingly, a short pulse signal(j) is outputted from the one shot circuit 24 each time of positive edges of the signal (h). The cycle of the pulse signal (j) is synchronous with the signal oscillated by the oscillator 20. The pulse signal (j) is inputted to the battery check circuit 26 as the signal (k) via OR circuit OR2 and the power supply voltage Vcc is checked at the timing in accordance with the pulse signal (k).

Infrared light signal is transmitted from the transmitter 12 according to the transmitted data and the signal is amplified and detected by the amplification and detection circuit 14, and then read by the data read circuit 16. Time period T2 from time t2 until time t3 and time period T2 from time t4 until t5 in FIG. 10 shows the condition of each signal thus transmitted. In this case, the timer signal (e) of the timer circuit 18 keeps "L" and the warning signal (c) outputted from the amplification detection circuit 14 keeps "L" as well.

When the data read circuit 16 reads the transmitted data correctly, the verify signal (d) of "H" is outputted during the time period T2. The output signal of OR circuit OR1 becomes "H" for the time period T2 according to the verify signal (d) thus outputted. Accordingly, the signal (m) of "H" is outputted from the delay circuit 28 of time period $\tau_0$ later than the verify signal (d) of the data read circuit 16 and the output is maintained for the time period T2. The signal "H" drives the display drive circuit 30 to output a signal (n) of "H" and the continues for the time period T2. Consequently, the light emitting diode VLED for indicating verify is lighted and the lighting continues for the time period T2. Since the verify signal (d) of "H" inverts the signal (g) outputted from NOR circuit NOR1 to "L", one of the inputs of AND circuit AND1 becomes "L", so that the signal (h) outputted from the AND circuit AND1 keeps "L". Accordingly, the signal (f) outputted from the oscillator 20 does not appear in the signal (h) outputted from the AND circuit AND1. Since the signals (i) and (j) inputted to the OR circuit OR2 remains "L" during the data reading period, the battery check circuit 26 does not operate during this time period.

When the verify signal (d) of the data read circuit 16 is inverted to "L" at time t3 or t5, a short pulse signal appears in the signal (i) outputted from the one shot circuit 22 as it occurs at the time t1 and the power supply voltage Vcc is checked by the battery check circuit 26 according to the timing of this pulse. At this point, an inversion of the verify signal (d) is transmitted to the display drive circuit 30 through the delay circuit 28 after the time period $\tau_0$ later than the inversion, so that the lighting of the diode VLED for indicating verify continues.

Next, the operation of the signals from the time t6 until t7 is described below. This operation is made when the intensity of peripheral light is high. When the amplification and detection circuit 14 determines that the intensity of peripheral light is over a predetermined value, "H" is outputted as the warning signal (c). This causes the output from the OR circuit OR1 to be "H", with the result that the light emitting diode VLED for indicating verify is lighted after the time period $\tau_0$ from the time when the warning signal (c) is built up. According to this lighting, users know that the intensity of peripheral light is high.

In this case, both the timer signal (e) of the timer circuit 18 and the verify signal (d) of the data read circuit 16 are "L". Accordingly, the signal (g) outputted from the NOR circuit NOR1 is "H" and a short pulse is outputted from the OR circuit OR2 as the output signal (k) according to the oscillation signal (f) outputted from the oscillator 20, which permits the the battery check circuit 26 to check the power supply voltage periodically.

The reasons the timing pulse (signal (k)) which actuates the battery check circuit 26 is not outputted in the time period from the time t0 to t1, t2 to t3, and t4 to t5 but in other times, is as follows: One of them is not to confuse users in distinguishing one indication from the other during the fixed time period T1 from the time t0 to t1. This purpose is achieved by turning on only the light emitting diode VLED for indicating verify without turning on the light emitting diode BCLED in the fixed time period T1 which is just after the power supply switch SW1 has been closed. The other reason is as follows: If a battery check is made and the power supply voltage Vcc is determined to be lower than the predetermined value Vref3 during the time period from the time t2 to t4 and from the time t4 to t5 "H" is inputted from the output signal (0) of the battery check circuit 26 to the data read circuit 16, and thus, the verify signal (d) is inverted to "H" and the light emitting diode VLED for indicating verify is turned off and the operation is stopped, with the result that the time period for turning on the light emitting diode VLED for indicating verify is shorter than the fixed time period T2. These are the reasons a battery check operation is not made during the above-described three time periods.

It is neccessary to identify an indication using of the lighting of light emitting diodes, made in a receiver of an optical communication apparatus, from a distant place. Therefore, the light emitting diode for indication is driven by electric current having a relatively large quantity, which means that it is not preferable to light the light emitting diode BCLED for warning a lowering of voltage while the light emitting diode VLED for indicating verify is being lighted. In view of this, a battery check is not made for the time period from the time t0 to t1, from t2 to t3, and from t4 to t5.

According to the present embodiment, a battery check operation of the battery check circuit 26 is made at the times t1, t3, and t5 for checking whether or not the sufficient power supply would be kept thereafter. Such times t1, t3, and t5 are selected by the reason that the power supply voltage Vcc is assumed to be lowest immediately before the light emitting diode VLED is turned off.

The time chart (2) in FIG. 10 shows the operation when the power supply voltage Vcc is below the predetermined value Vref3. The battery check circuit 26 checks the power supply voltage Vcc according to the pulse (k) outputted from OR circuit OR2. When the battery check circuit 26 determines that the power supply voltage Vcc is below the predetermined value Vref3, "H" is outputted from the output (1)(o), which causes, the light emitting diode BCLED for warning of a lowering of voltage, to light and the operation of the data read circuit 16 to be stopped. In the battery check circuit 26, once the power supply voltage Vcc is lower than the predetermined value Vref3, the output power (1)(0) remains "H" even if the power supply voltage Vcc is over the predetermined value Vref3. This condition is cleared by opening the power supply switch SW1.

The time chart (3) in FIG. 10 shows the operation of the battery check system in the condition when the power supply voltage Vcc is lowered below the predetermined value Vref3 while the timer circuit 18 is being operated by the closure of the power supply switch SW1. The battery check system does not operate for the time period T1 from t9 to t10, as described above, since the timer signal (e) of the timer circuit 18 is "H". When the timer signal (e) becomes "L", the battery check operation starts. When the power supply voltage Vcc is determined to be below the predetermined value Vref3, the light emitting diode BCLED for warning of a lowering of voltage is lighted.

The time chart (4) in FIG. 10 shows the operation of the battery check circuit system in the condition when the voltage Vcc of the power supply battery E is lower than the limit voltage Vo which corresponds to a minimum voltage to drive the operation in the circuit and the light emitting diodes. In this case, since both of the light emitting diodes VLED and BCLED are not turned on in response to the closing of the power supply switch SW1, a lowering of voltage of the power supply battery E is immediately indicated. As apparent from the comparison of time chart (1) with time chart (4), in the normal condition of (1), unless the light emitting diode VLED for indicating verify is lighted for the time period T1 after the power supply switch SW1 is closed, distinction of the normal condition of time chart (1) from the condition of time chart (4). Therefore, in this embodiment, a lighting of the of the emitting diode VLED for indicating verify continues for the time period T1 in the normal condition.

The time chart (5) in FIG. 10 shows the operation when the power supply voltage Vcc becomes lower than the predetermined voltage Vref3 while the light emitting diode VLED for indicating verify is being lighted after a transmitted data is correctly read by the data read circuit 16. In this situation the battery check circuit 26 is actuated at the time t14 in response to the pulse signal (k) generated in the condition when the light emitting diode VLED for indicating verify is turned off, and the power supply voltage Vcc is checked to determine whether or not it has lowered. If it has lowered, the light emitting diode BCLED for warning of a lowering of voltage is lighted to warn that the power supply voltage Vcc has lowered.

Figure 11:
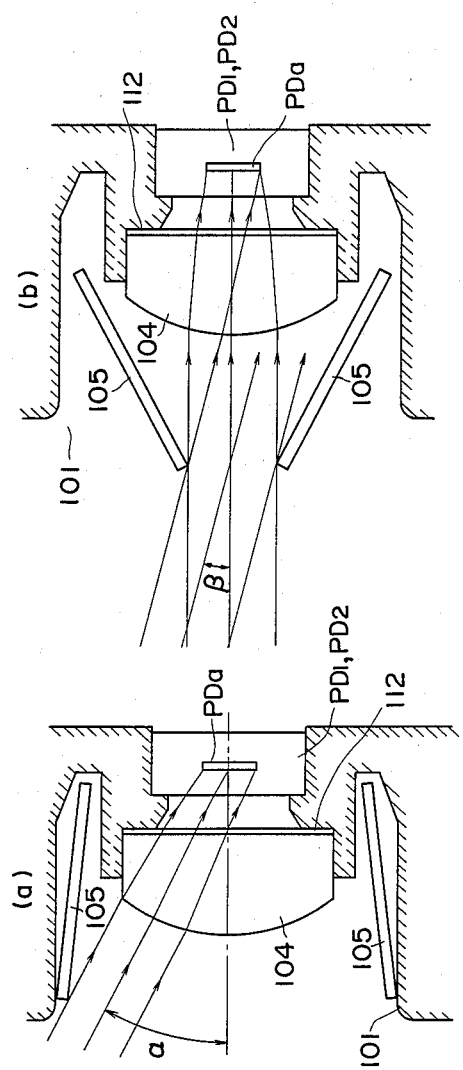
FIG. 11 is B cross-sectional view of the camera system shown in FIG. 1.

Next, the inner structure of the receiver 6 shown in FIG. 1 is described below. FIGS. 11 (a) (b) show the B cross-sectional view of the receiver 6 shown in FIG. 1. Mounted in the light receiving window 101 are a pair of light receiving lenses 104, a pair of band pass filters 112, and the light receiving elements PD1 and PD2. A pair of light shading hoods 105 are mounted outside the light receiving lens 104 at its upper and lower portions. FIG. 11 (a) (b) show the relation between the position of the light shading hoods 105 and incident light which pass through the lenses 104 to the light receiving elements PD1 and PD2. In FIG. 11 (a), the light shading hoods 105 are completely opened, and, in FIG. 11 (b), the opening angle of the light shading hoods 105 are relatively small.

Figure 12:
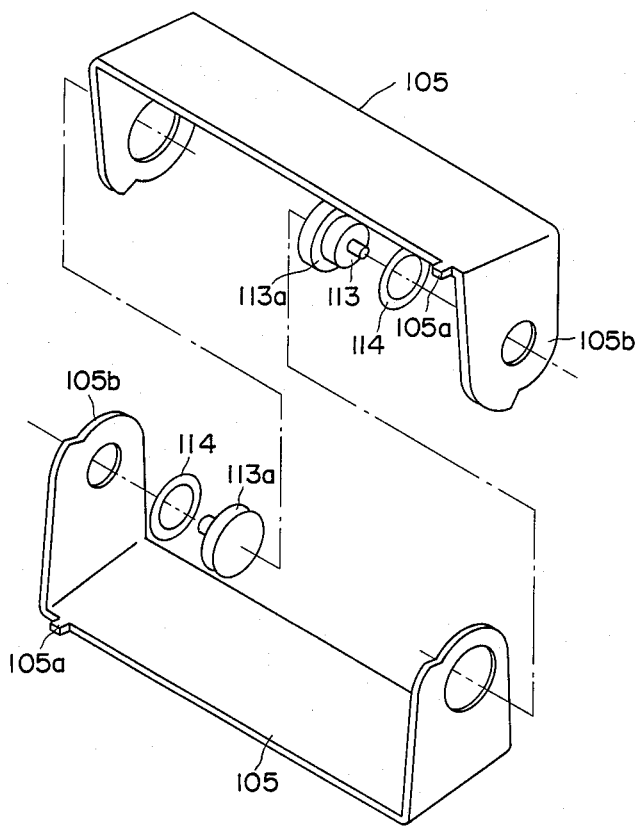
FIG. 12 is a perspective illustration showing the light shielding hood of the camera system in FIG. 1.

FIG. 12 is a perspective view showing the structure of the pair of the light shading hood 105 and the rotation axis 113 thereof. The light shading hoods 105 are supported by the rotation axis 113 by the frictional force of a friction washer 114 located between the rotation base 105b and the head portion 113a of the rotation axis 113 fixedly mounted on the receiver 6. The light shading hood 105 can be rotated around the rotation axis 113 by a manual operation of an operation knob 105a. They can be rotated in any degree such as the condition (a) and (b).

Figure 13:
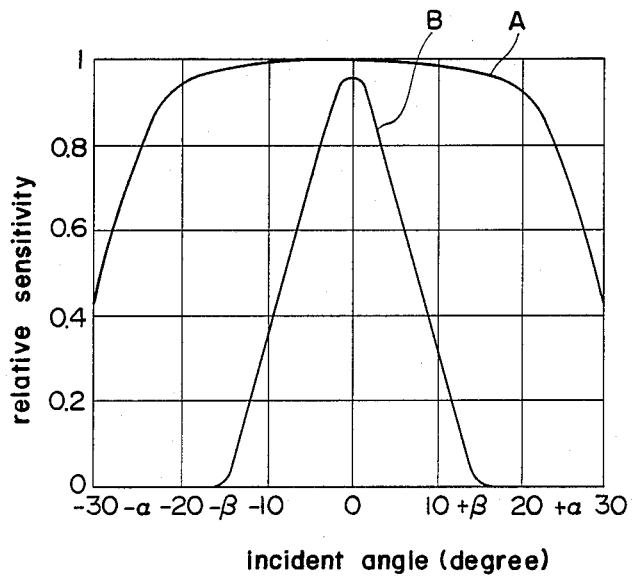
FIG. 13 is a graph showing the specific sensitivities of the optical light receiving element at the time when the light shielding hood is opened and closed.

FIG. 13 is a graph showing relative sensitivity of the light receiving elements PD1 and PD2 in accordance with the incident angle of light ray thereon. The curve A in FIG. 13 shows the characteristic when the angle of opening of the light shading hoods 105 is large as shown in FIG. 11 (a) and the curve B shows the characteristic when the light shading hoods 105 are opened to a small degree.

Commonly, the light shading hoods 105 are used by maximizing an angle of opening as shown in FIG. 11 (a). In this condition, light rays which passes with having an angle α relative to the optical axis can be received by the element chip PDa on its entire face thereof as shown in FIG. 11 (a). The relative sensitivity of the light receiving elements PD1 and PD2 is shown by the wide curve A as shown in FIG. 13. If much peripheral light passes into the receiver i.e., if the intensity of peripheral light is too strong around a transmitter, the receiver is incapable of receiving the transmitted optical signal correctly. This problem can be avoided by opening the light shading hoods 105 to a small degree as shown in FIG. 11 (b). In this condition, only light rays which pass virtually parallel with the optical axis can be received by the element chip PDa on the entire face thereof. Light rays which make more than β with the optical axis cannot reach the element chip PDa. The relative sensitivity of the light receiving elements PD1 and PD2 in this case is shown by the narrow curve B in FIG. 13. As indicated in FIG. 13, the curves A and B have almost the same sensitivity at the optical axis, while the area surrounded by the curve B and the horizontal axis is one of several ratios of the area surrounded by the curve A and the horizontal axis. Accordingly, if the intensity of peripheral light is strong, the light shading hoods 105 should be opened to such a degree as shown in FIG. 11 (b) to obtain the sensitivity shown by the curve B and the transmitter 12 should be placed on the optical axis of the receiver 6. According to this arrangement, the influence given by peripheral light is reduced to one of several ratios and the sensitivity of the receiver is the same as that obtained when the light shading hoods 105 are in such a condition as shown in FIG. 11 (a). Owing to this arrangement, even in the condition shown in FIG. 11 (a), normal light receiving can be made.

Since the light shading hoods 105 can be separately rotated to a desired degree, the center of the opening formed by the two hoods can be changed. Therefore, the sensitivity as shown by the curve B in FIG. 13 can be obtained by shifting the center of the opening formed by the two hoods from the optical axis.

Figure 14:
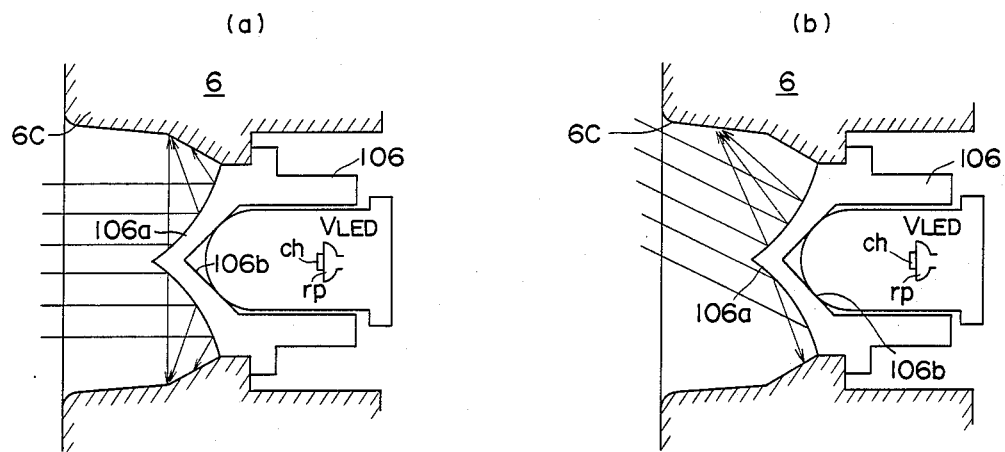
FIG. 14 is an A cross-sectional view of the camera system shown in FIG. 1.
Figure 15:
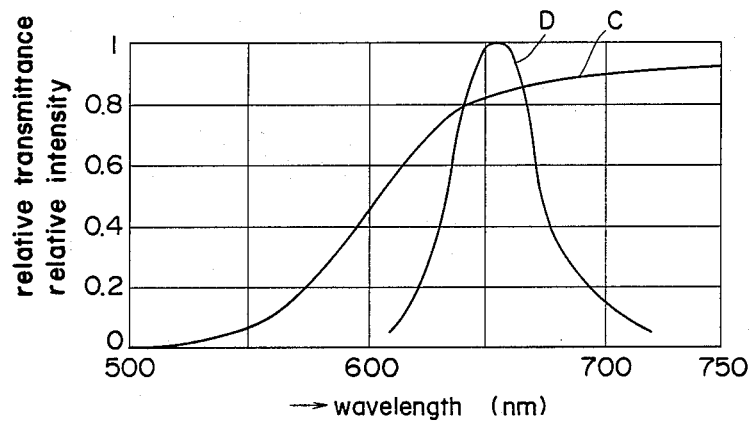
FIG. 15 is a graph showing the characteristics of the spectral transmission factor of an optical signal reception indication window and the emission characteristics of a light emitting diode.

FIGS. 14 (a) (b) show the A cross-sectional view of FIG. 1. The light emitting diode VLED for indicating verify is housed inside a signal reception indicating window 106. FIG. 14 (a) shows how light rays are reflected on the outer surface of the signal reception indicating window 106 when the rays are emitted from a distant point on its optical axis. FIG. 14 (b) shows how light rays are reflected on the outer surface of the signal reception indicating window 106 when the rays are emitted from a distant point apart from its optical axis. FIG. 15 is a graph showing the relative spectral transmittance characteristic (C) of the signal reception indicating window 106 with respect to the wavelength of incident light and the relative spectral intensity characteristic (D) with respect to the wavelength generated by the light emitting diode VLED for indicating verify signal.

Of the light rays reflected on the outer surface 106a of the signal reception indicating window 106a, only the light rays from a wall 6c of the receiver 6 can reach the eye. Accordingly, the wall 6c of the receiver is observed in the surface of the the signal reception indicating window 106. Here the wall 6c is painted black. Thus the user of the transmitter observes the wall 6c of low reflectance by the reflection of the outer surface 106a. Therefore, it is possible that the brightness is low on the surface of the signal reception indicating window 106. This structure has the same effect on the faces 106b faced to the light emitting diode VLED as the the above-described outer surface 106a. This structure can reduce the brightness of outdoor light reflected on the the signal reception indicating window 106 when it is externally viewed, so that the S/N ratio of the brightness externally viewed is high during the lighting of emitting diode VLED, which makes it easy for users to check the flashing of the light emitting diode VLED.

As shown in the curve C in FIG. 15, the signal reception indicating window 106 is made of the material which transmits most of wavelenght of the light generated by the light emitting diode VLED for indicating verify signal in visible wavelength region and absorbs the light existing in other wavelength region. Accordingly, component of the majority of the light which illuminate the chip face (ch) and the reflecting surface (rp) of the light emitting diode VLED are cut off by the signal light reception indicating window 106. Most of the light emitted from the light emitting diode VLED for indicating verify signal can pass through the signal light reception indicating window 106 to the outside. Therefore, the spectral transmittance characteristic also heightens S/N ratio of the brightness externally viewed when the light emitting diode VLED for indicating verify signal flashes, thereby facilitating observers to check flashing of the light emitting diode VLED for indicating verify signal.

From the foregoing, if there is likelihood that an optical signal incorrectly transmits data because the intensity of peripheral light is too high, the light emitting diode VLED for indicating verify signal is lighted to warn of it. Owing to this structure according to the embodiment, users can receive a correct data by properly locating the position of the receiver 6 i.e., a mulfunction caused by an incorrect information transmission can be prevented. Further, possibility of the occurrence of a mulfunction caused by peripheral light can be reduced by lowering the intensity of the amplification and detection circuit 14 when the intensity of peripheral light is high. Furthermore, according to the embodiment, if the power supply voltage is adequate enough, the light emitting diode VLED for indicating verify signal is lighted for a certain period of time after the power supply switch SW1 is closed. When the power supply voltage has lowered a little, the light emitting diode VLED for indicating verify signal and the light emitting diode for warning of a lowering of of voltage. When the power supply voltage has lowered in a great quantity, neither VLED nor BCLED is lighted. Thus, the above-described three conditions can be indicated by two indicating elements. Another feature of the invention is that since the amplification and detection circuit 14 can separate the photoelectric current influenced by peripheral light component from the photoelectric current influenced by signal component and the above-described indications as well as sensitivity conversions can be made according to peripheral light component, a correct optical communication even the outdoors where the intensity of peripheral light is high.

According to the embodiment, peripheral light component can be detected by the outputs of the light receiving elements PD1 and PD2 for receiving signal, however, the method for detecting peripheral light component is not restricted to this method. For example, a light receiving element may be separately provided for detecting peripheral light. The structure of an apparatus for receiving optical light can be more simple if a signal receiving element provided therein has a function of acting as a peripheral light receiving element as well.

Figure 16:
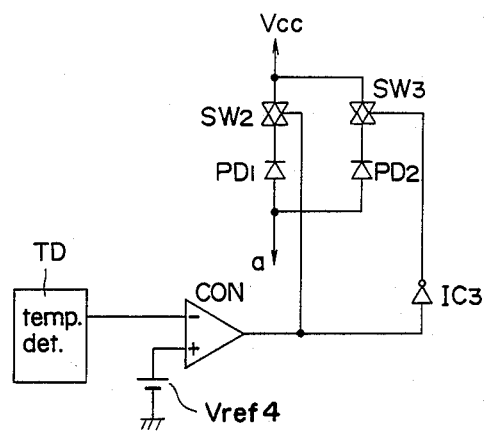
FIG. 16 is a circuit diagram showing principal portions of another embodiment.

FIG. 16 is a circuit diagram showing the principal portions of another embodiment according to the invention which selects either the light receiving elements PD1 or PD2 according to temperature thereof. In FIG. 16, the voltage Vcc from the power supply battery E is connected to analog switches SW2 and SW3 connected in series to the the cathodes of the light receiving elements PD1 and PD2, respectively. The inversion input terminal of a comparator CON3 is connected to a temperature detecting circuit TD which outputs voltage proportional to a detected temperature. The non-inversion input terminal of a comparator CON3 is connected to the reference power supply voltage Vref4. The output of the comparator CON3 is connected to the gate of the analog switch SW2 as well as to the gate of the analog switch SW3 via an inverter circuit IC3. The anodes of light receiving elements PD1 and PD2 are connected with each other as the output signal (a) to the amplification and detection circuit 14 shown in FIG. 3. The spectral sensitivity characteristic of the light receiving elements PD1 and PD2 are shown by curves K and F in FIG. 17, respectively.

Figure 17:
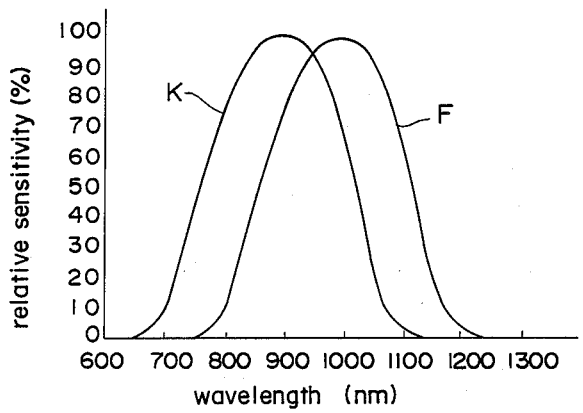
FIG. 17 is a graph showing the spectral sensitivity characteristics of the optical signal receiving element of the embodiment in FIG. 16.
Figure 18:
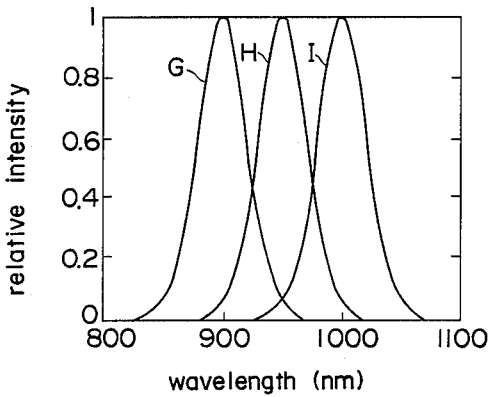
FIG. 18 is a graph showing the change of the emission characteristic of a light emitting diode according to temperatures.

The operation of this embodiment is described below. It is most preferable that, in an optical communication, apparatus the spectral sensitivity of the light receiving element in a receiver is coincident with that of the spectral light emitting characteristic of the light emitting diode in a transmitter. However, generally, the peak wavelength of a light emitting diode shifts toward long wavelength side i.e., from G toward H or I as shown in FIG. 18 with a rise of temperature. Therefore, even if the light receiving elements PD1 and PD2 have the same spectral sensitivity and the same spectral sensitivity characteristic as the spectral light emitting characteristic of a light emitting diode at low temperatures, the spectral sensitivity of the light emitting diode changes with the rise of temperature as described above. As a result, of the photoelectric current generated by the light receiving diodes PD1 and PD2, the quality of photoelectric current generated by signal is small as against the large quantity of the photelctric current generated by peripheral light, which deteriorates S/N ratio. According to this embodiment, as shown in FIG. 17, two light receiving elements having different spectral sensitivities are mounted on the apparatus. That is, the output of the light receiving element PD1 is used at low temperatures, while the output of light receiving element PD2 is used at high temperatures, thereby operating the apparatus at a high S/N ratio both at low and high temperatures.

The temperature detecting circuit TD used in this embodiment detects a temperature and outputs voltage in proportion to temperature. That is, at low temperatures, the voltage outputted from the temperature detecting circuit TD is low, while at high temperatures, the voltage outputted therefrom is high. When the voltage outputted from the temperature detecting circuit TD is lower than that the voltage of the reference power supply Vref4 i.e., at low temperatures, the output from the comparator CON3 becomes "H". Thereafter, the signal of "H" is transmitted into the gate of the analog switch SW2 and the analog switch SW2 becomes conductive. Thus, the output from the light receiving element PD1 having the spectral sensitivity characteristic as shown by curve K in FIG. 17 is adopted. In this condition, since the output from the inverter circuit IC3 becomes "L", the analog switch SW3 becomes non-conductive.

With the rise of temperature, the voltage outputted from the temperature detecting circuit TD becomes high and when it becomes higher than the voltage outputted from the reference supply Vref4, the output from the comparator CON3 becomes "L". By the input of this signal, the analog switch SW2 becomes non-conductive, while the output from the inverter circuit IC3 becomes "H". As a result, the signal of "H" is inputted to the gate of the analog switch SW3 and it becomes non-conductive. Thus, the output from the light receiving element PD2 is adopted instead of the output from the light receiving element PD1.

By using the two light receiving elements having different spectral sensitivities, the output from the light receiving element PD1 having the spectral sensitivity similar to the emission characteristic of a light emitting diode at low temperatures is adopted, while at high temperatures, the output from the light receiving element PD2 having the spectral sensitivity similar to the emission characteristic of the light emitting diode at high temperatures is adopted. Thus, the spectral sensitivity characteristic of the light receiving element can be coincident with the spectral light emitting characteristic of the light emitting diode both at low and high temperatures, thereby improving S/N ratio.

S/N ratio can be improved if the spectral sensitivity characteristics of the light receiving elements PD1 and PD2 are similar to that of the light emitting diode; the curves may veer from those as shown in FIG. 17.

Figure 19:
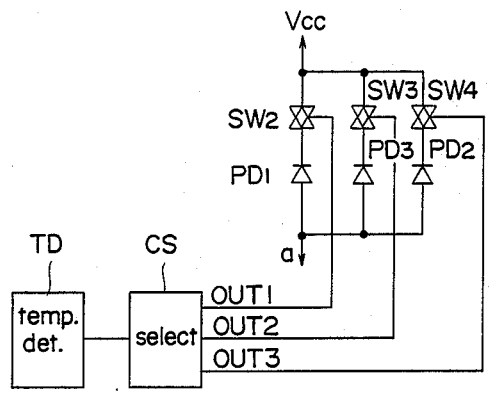
FIG. 19 is a circuit diagram showing a modification of the circuit diagram shown in FIG. 16.
Figure 20:
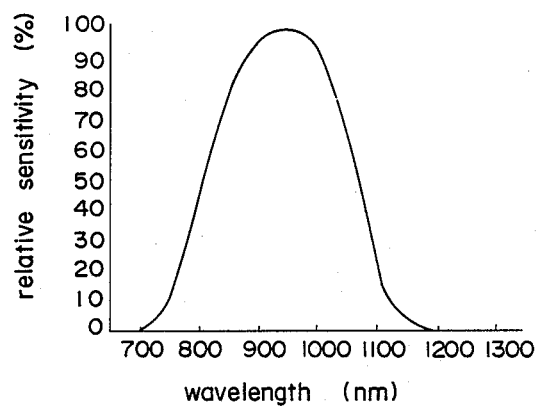
FIG. 20 is a graph showing the spectral sensitivity characteristic of light signal receiving element used in the above modification.

FIG. 19 is a circuit diagram showing a modification of the embodiment shown in FIG. 16. The modified circuit shown in FIG. 19 is provided with three (three different spectral sensitivities) light receiving elements PD1, PD2, and PD3 and any one of the three is adopted according to temperature. FIG. 20 is a graph showing the spectral sensitivity characteristic of the third light receiving element PD3 which is added to the previously described two light receiving elements PD1 and PD2. A circuit may be structured by using more than four light receiving elements in which any one of the four is selectively adopted according to temperature. The description thereof is omitted herein because such a structure is easily devised with reference to FIG. 19.

In FIG. 19, the temperature detecting circuit TD is as shown in FIG. 16 and the output of the circuit TD is inputted to a selection circuit CS. The output OUT1 from the selection circuit CS is connected to the gate of the analog switch SW2 connected in series to the light receiving element PD1 and the output OUT2 is connected to the gate of the analog switch SW3 connected in series to the light receiving element PD3. The output OUT3 is connected in series to the gate of the analog switch SW4 connected in series to the light receiving element PD2. The selection circuit CS takes in the voltage proportional to the temperature transmitted from the temperature detecting circuit TD and when the voltage is small i.e., at low temperatures, the selection circuit CS makes only the OUT1 become "H". At this point, the signals of the outputs OUT2 and OUT3 are both "L". When temperature rises a little and the input voltage to the selection circuit CS rises, only the signal of the output OUT2 is made "H" and the signals of the outputs OUT1 and OUT3 are made "L". With a further rise of temperature and the input voltage to the selection circuit CS, the comparison selection circuit CS makes only the signal of the output OUT3 "H".

A simple description of the operation of the modification is made below because detailed description of the operation has already been made with regard to the embodiment shown in FIG. 16. When the temperature detected by the temperature detecting circuit TD is low, only the signal outputted from the comparison selection circuit CS becomes "H", which makes the analog switch SW2 conductive, and, as a result, the output from the light receiving element PD1 is adopted. When temperature rises to such a degree as to improve S/N by the use of the output from the light receiving element PD3 rather than the use of the output from the light receiving element PD1, the comparison selection circuit CS makes the output OUT2 "H", and adopts the output from the light receiving element PD3. When temperature further rises to such a degree as to improve S/N by the adoption of the output from the light receiving element PD2 rather than the adoption of the light receiving element PD3, the comparison selection circuit CS makes only the output OUT3 "H" and adopts the output from the light receiving element PD2.

The S/N obtained by using light receiving elements which have different spectral sensitivities is much higher than that obtained by the embodiment shown in FIG. 16. The spectral sensitivities of the light receiving elements PD1 and PD2 curves may veer from those shown in FIGS. 17 and 20. A preferable S/N can be obtained if they are similar to the spectral sensitivity characteristics of a light emitting diode.

Although the present invention has been fully described by way of example with reference to the accompanying drawings, it is to be noted here that various changes and modifications will be apparent to those skilled in the art. Therefore, unless otherwise such changes and modifications depart form the scope of the present invention, they should be construed as being included therein.

What is claimed is:

1. An optical signal receiving apparatus for optical communication, comprising:
   means for measuring intensity of peripheral light corresponding to the brightness of the periphery of the optical signal receiving apparatus, including means for receiving light incident on the optical signal receiving apparatus to produce a photoelectric signal corresponding to the intensity of light received, and means, connected in series to the receiving means, for transmitting a noise component having a frequency lower than a predetermined frequency in the photoelectric signal;
   means for discriminating whether the measured intensity of the peripheral light is over a predetermined intensity level, and
   means for displaying an indication when the measured intensity is discriminated to be over the predetermined intensity level.

2. The optical signal receiving apparatus as claimed in claim 1, wherein the transmitting means includes an inductance means connected in series to the receiving means.

3. The optical signal receiving apparatus as claimed in claim 2, wherein the receiving means include a photoelectric element for producing a photoelectric current corresponding to the intensity of light received thereby.

4. The optical signal receiving apparatus as claimed in claim 3, further comprising means for receiving light incident on the apparatus to produce a receiving signal used for optical communication; means for controlling angle of light which can be received by the light receiving means.

5. The optical signal receiving apparatus as claimed in claim 4, wherein the angle controlling means includes means for limiting the width of light bundles which can be received by the light receiving means.

6. The optical signal receiving apparatus as claimed in claim 5, wherein the width limiting means includes at least a light shading member movable in incident light path of the light receiving means.

7. The optical signal receiving apparatus as claimed in claim 6, wherein the width limiting means includes a pair of light shading members provided symmetrically with each other with respect to an optical axis of the light receiving means.

8. The optical signal receiving apparatus as claimed in claim 7, wherein the pair of light shading members are movable independent of each other by manual operation.

9. The optical signal receiving apparatus as claimed in claim 8, wherein the pair of light shading members are supported rotatably with respect to a rotational axis perpendicular to the optical axis of the light receiving means.

10. An optical signal receiving apparatus for optical communication, comprising:
    means for measuring intensity of peripheral light corresponding to the brightness of the periphery of the optical signal receiving apparatus;
    means for discriminating whether the measured intensity of the peripheral light is over a predetermined intensity level, and
    means for displaying an indication when the measured intensity is discriminated to be over the predetermined intensity level, including means for emitting light having a predetermined wavelength range for the indication; a wavelength selecting member, located in front of the light emitting means, for selectively transmitting light having the predetermined wavelength towards outside of the apparatus, said wavelength selecting member having an outer surface, faced to the outside, convex to the outside, and an inner surface, faced to the light emitting means, convex to the outside, and a wall member, located in the periphery of the wavelength selecting member, having an inner wall extended towards the outside for facing to the outer surface of the wavelength selecting member, said inner wall having relatively low reflectance.

11. The optical signal receiving apparatus as claimed in claim 10, wherein the outer surface of the wavelength selecting member and the inner surface thereof have cone shapes convex to the outside.

12. The optical signal receiving apparatus as claimed in claim 10, wherein the outer surface of the wavelength selecting member and the inner surface thereof have pyramid shapes convex to the outside.

13. An optical signal receiving apparatus for optical communication, comprising:
means for measuring intensity of peripheral light corresponding to the brightness of the periphery of the optical signal receiving apparatus, including means for receiving light incident on the apparatus to produce a light receiving signal corresponding to the intensity of light received thereby; means for separating the light receiving signal into a signal light component corresponding to an optical signal component transmitted from an optical signal transmitting apparatus and a peripheral light component corresponding to the intensity of peripheral light; means for comparing the separated peripheral light component with a predetermined amount; means for receiving the separated optical signal component in order to read data transmitted from the optical signal transmitting apparatus; means for switching the sensitivity of the optical signal component receiving means in accordance with the compared result of the comparing means;
means for discriminating whether the measured intensity of the peripheral light is over a predetermined intensity level, and
means for displaying an indication when the measured intensity is discriminated to be over the predetermined intensity level.

14. The optical signal receiving apparatus as claimed in claim 13, wherein the switching means controls the sensitivity of the optical signal component receiving means so that the signal component receiving means is set to have relatively lower sensitivity when the separated peripheral light component is larger than the predetermined amount, and to have relatively higher sensitivity when the separated peripheral light component is less than the predetermined amount.

15. The optical signal receiving apparatus as claimed in claim 13, further comprising means for selecting one of the plurality of light receiving elements and in accordance with the output of which the detecting means detects the optical signal.

16. An optical signal receiving apparatus for optical communication, comprising:
means for measuring intensity of peripheral light corresponding to the brightness of the periphery of the optical signal receiving apparatus, including means for receiving light incident on the apparatus, having a plurality of light receiving elements, each spectral sensitivity being different from the other, and means for detecting the optical signal transmitted from an optical signal transmitting apparatus in accordance with outputs of plurality of light receiving elements to read data transmitted from the optical signal transmitting apparatus;
means for discriminating whether the measured intensity of the peripheral light is over a predetermined intensity level, and
means for displaying an indication when the measured intensity is discriminated to be over the predetermined intensity level.

17. The optical signal receiving apparatus as claimed in claim 16, further comprising, means for detecting temperature in periphery of the apparatus to produce a temperature signal corresponding to the detected temperature; plurality of switching means each connected each of one terminal of the plurality of light receiving elements; means for controlling the plurality of switching means being in accordance with the temperature signal, all of the other terminal of the plurality of light receiving elements being connected to each other.

18. An optical signal receiving apparatus for optical communication, comprising:
means for measuring intensity of peripheral light corresponding to the brightness of the periphery of the optical signal receiving apparatus;
means for discriminating whether the measured intensity of the peripheral light is over a predetermined intensity level;
means for displaying an indication when the measured intensity is discriminated to be over the predetermined intensity level, including first means for emitting light when the measured intensity of the peripheral light is over a predetermined intensity level;
means for supplying electric power into the apparatus;
means for detecting voltage of the electric power supplying means to produce a first signal when the detected voltage is below a predetermined voltage;
means for controlling said first light emitting means so as to drive the first light emitting means in accordance with the first signal, and to interpret the light emission of the first light emitting means due to the first signal, prior to the light emission of the first light emitting means due to the condition in which the measured intensity of the peripheral light is over said predetermined intensity level;
means for enabling the electric power supply of the electric power supplying means to supply power to the apparatus to produce a second signal in response to the enabling of the electric power supply, and
second means for emitting light in accordance with the second signal.

19. The optical signal receiving apparatus as claimed in claim 18, wherein the voltage detecting means includes means for detecting the electric load loaded to the apparatus to produce battery check signals each time when the detected load is over a predetermined load level; and means for detecting voltage of the electric power supplying means in response to the battery check signal.

20. The optical signal receiving apparatus as claimed in claim 18, wherein the voltage detecting means includes means for producing battery check signals at a predetermined period; and means for detecting voltage of the electric power supplying means in response to the check signal.

21. The optical signal receiving apparatus as claimed in claim 18, wherein the voltage detecting means includes means for detecting the electric load loaded to the apparatus to produce a first battery check signals each time when the detected load is over a predetermined load level; means for producing second battery check signals at a predetermined period; and means for detecting voltage of the electric power supplying means in response to both of the first and second battery check signals.

22. The optical signal receiving apparatus as claimed in claim 18, wherein the starting means produces a second signal for a predetermined time period after the start of the electric power supply.

23. In a camera system, the improvement of a compact optical signal receiving apparatus for optical communication, comprising:
  means for mounting the apparatus on a camera body;
  means for measuring the intensity of peripheral light corresponding to the brightness of the periphery of the optical signal receiving apparatus;
  means for discriminating whether the measured intensity of the peripheral light is over a predetermined intensity level;
  means for displaying an indication whether the measured intensity is discriminated to be over the predetermined intensity level, the displaying means including means for emitting light having a predetermined wavelength range for the indication;
  a wavelength selecting member, located in front of the light emitting means, for selectively transmitting light having a predetermined wavelength towards the outside of the apparatus, said wavelength selecting member having an outside surface, facing towards the outside, convex to the outside, and an inner surface based towards the light emitting means, convex to the outside, and
  a wall member, located in the periphery of the wavelength selecting member, having an inner wall extended towards the outside for facing to the outer surface of the wavelength selecting member, said inner wall having relatively low reflectance.

24. The optical signal receiving apparatus as claimed in claim 23, wherein the outer surface of the wavelength selecting member and the inner surface therefore have cone shapes convex to the outside.

25. The optical signal receiving apparatus as claimed in claim 23, wherein the outer surface of the wavelength selecting member and the inner surface thereof have pyramid shapes convex to the outside.

26. An optical signal receiving apparatus for optical communication, comprising:
  means for measuring the intensity of peripheral light corresponding to the brightness of the periphery of the optical signal;
  means for discriminating whether the measured intensity of the peripheral light is over a predetermined intensity level;
  means for displaying an indication when the measured intensity is discriminated to be over the predetermined intensity level;
  means for receiving light incident on the apparatus, having a plurality of light receiving elements, each element having a spectral sensitivity different from the other;
  means for detecting the optical signal transmitted from an optical signal transmitting apparatus in accordance with outputs of the plurality of light receiving elements;
  means for detecting temperature in the periphery of the apparatus to produce a temperature signal corresponding to the detected temperature;
  a plurality of switching means, each connected to a terminal of the plurality of light receiving elements, and
  means for controlling the plurality of switching means in accordance with the temperature signal.

27. An optical signal receiving apparatus, comprising:
  means for receiving light incident on the apparatus, having a plurality of light receiving elements, with the spectral sensitivity of each light receiving element being different from the other;
  means for detecting an optical signal transmitted from an optical signal transmitting apparatus in accordance with the outputs of the plurality of light receiving elements corresponding to the incident light, and reading data transmitted from the optical signal transmitting apparatus;
  means for detecting temperature in the periphery of the apparatus to produce a temperature signal corresponding to the detected temperature;
  a plurality of switching means, each connected to one of the terminals on each of the plurality of light receiving elements, all of the other terminals of the plurality of light receiving elements being connected to each other, and
  means for controlling the plurality of light switching means in accordance with the temperature signal.

* * * * *